(12) United States Patent
Nakagawara (10) Patent No.: US 8,619,155 B2
(45) Date of Patent: Dec. 31, 2013

(54) LIGHT-EMITTING APPARATUS, IMAGE PICKUP APPARATUS, AND CAMERA SYSTEM CAPABLE OF CHANGING EMISSION COLOR TEMPERATURE

(75) Inventor: Naoyuki Nakagawara, Tokyo (JP)

(73) Assignee: Canon Kabushiki Kaisha (JP)

( * ) Notice: Subject to any disclaimer, the term of this patent is extended or adjusted under 35 U.S.C. 154(b) by 344 days.

(21) Appl. No.: 13/187,111

(22) Filed: Jul. 20, 2011

(65) Prior Publication Data

US 2012/0026356 A1 Feb. 2, 2012

(30) Foreign Application Priority Data

Jul. 30, 2010 (JP) ................................ 2010-172196

(51) Int. Cl.
*H04N 9/73* (2006.01)

(52) U.S. Cl.
USPC .......................... 348/223.1; 348/370; 348/371

(58) Field of Classification Search
USPC ............................. 348/222.1, 223.1, 370, 371
See application file for complete search history.

(56) References Cited

U.S. PATENT DOCUMENTS

| | | | | |
|---|---|---|---|---|
| 5,805,213 A * | 9/1998 | Spaulding et al. | ......... | 348/222.1 |
| 6,448,550 B1 * | 9/2002 | Nishimura | ..................... | 250/226 |
| 2003/0076424 A1 * | 4/2003 | Minakuti et al. | ........... | 348/223.1 |
| 2003/0107887 A1 * | 6/2003 | Eberl | ........................... | 362/227 |
| 2005/0002021 A1 * | 1/2005 | Kreh et al. | ................. | 356/237.2 |
| 2005/0030538 A1 * | 2/2005 | Jaffar et al. | ................... | 356/405 |
| 2005/0063195 A1 * | 3/2005 | Kawakami | ..................... | 362/545 |
| 2005/0122409 A1 * | 6/2005 | Takeshita | ................... | 348/223.1 |
| 2005/0134723 A1 * | 6/2005 | Lee et al. | ...................... | 348/370 |
| 2005/0195290 A1 * | 9/2005 | Takeshita | ................... | 348/223.1 |
| 2005/0259176 A1 * | 11/2005 | Kyuma | ......................... | 348/362 |
| 2006/0062092 A1 * | 3/2006 | Ueyama | .................... | 369/30.01 |
| 2006/0187321 A1 * | 8/2006 | Sakamoto | ..................... | 348/239 |
| 2007/0024720 A1 * | 2/2007 | Awazu | ........................ | 348/223.1 |
| 2007/0257992 A1 * | 11/2007 | Kato | ........................... | 348/223.1 |
| 2008/0075447 A1 * | 3/2008 | Wernersson | .................. | 396/155 |
| 2008/0303918 A1 * | 12/2008 | Keithley | ................... | 348/223.1 |
| 2011/0298947 A1 * | 12/2011 | Guo et al. | ................. | 348/224.1 |

FOREIGN PATENT DOCUMENTS

| | | | |
|---|---|---|---|
| JP | 2002-116481 A | 4/2002 | |
| JP | 2006-322986 A | 11/2006 | |

* cited by examiner

*Primary Examiner* — Nicholas Giles
*Assistant Examiner* — Abdelaaziz Tissire
(74) *Attorney, Agent, or Firm* — Rossi, Kimms & McDowell LLP (57) ABSTRACT

A light-emitting apparatus which is capable of emitting light at desired emission color temperature even when aged deterioration of a light-emitting unit occurs. The light emitting unit has a plurality of LEDs that emit light in different colors, and is capable of changing emission color temperature of the light-emitting unit by changing the ratio of an amount light emitted by the LEDs. A emission color temperature of the light-emitting unit is set, and the light-emitting unit is flashed based on parameters corresponding to the set emission color temperature. Color temperature data on the image data is obtained based on image data obtained by performing image pickup by flashing the light-emitting unit based on the parameters. The parameters corresponding to the set emission color temperature are corrected based on the color temperature data on the set emission color temperature and the obtained color temperature data.

24 Claims, 7 Drawing Sheets

| COLOR TEMPERATURE (K) | I(RED) | I(GRN) | I(BLU) |
|---|---|---|---|
| 2800 | 2.60 | 1.00 | 0.57 |
| 3000 | 2.31 | 1.00 | 0.61 |
| 3200 | 2.07 | 1.00 | 0.65 |
| 3400 | 1.89 | 1.00 | 0.69 |
| 3600 | 1.74 | 1.00 | 0.72 |
| 3800 | 1.62 | 1.00 | 0.75 |
| 4000 | 1.51 | 1.00 | 0.78 |
| 4200 | 1.42 | 1.00 | 0.81 |
| 4400 | 1.35 | 1.00 | 0.84 |
| 4600 | 1.28 | 1.00 | 0.86 |
| 4800 | 1.23 | 1.00 | 0.88 |
| 5000 | 1.18 | 1.00 | 0.91 |
| 5200 | 1.13 | 1.00 | 0.93 |
| 5400 | 1.09 | 1.00 | 0.95 |
| 5600 | 1.06 | 1.00 | 0.97 |
| 5800 | 1.03 | 1.00 | 0.98 |
| 5900 | 1.02 | 1.00 | 0.99 |
| 6000 | 1.00 | 1.00 | 1.00 |
| 6100 | 0.98 | 1.00 | 1.01 |
| 6200 | 0.97 | 1.00 | 1.02 |
| 6400 | 0.95 | 1.00 | 1.03 |
| 6600 | 0.93 | 1.00 | 1.04 |
| 6800 | 0.91 | 1.00 | 1.06 |
| 7000 | 0.89 | 1.00 | 1.07 |
| 7200 | 0.88 | 1.00 | 1.08 |
| 7400 | 0.86 | 1.00 | 1.09 |
| 7600 | 0.85 | 1.00 | 1.11 |
| 7800 | 0.83 | 1.00 | 1.12 |
| 8000 | 0.82 | 1.00 | 1.13 |
| 8200 | 0.81 | 1.00 | 1.14 |
| 8400 | 0.80 | 1.00 | 1.14 |
| 8600 | 0.79 | 1.00 | 1.15 |
| 8800 | 0.78 | 1.00 | 1.16 |
| 9000 | 0.77 | 1.00 | 1.17 |
| 9200 | 0.76 | 1.00 | 1.18 |
| 9400 | 0.76 | 1.00 | 1.18 |
| 9600 | 0.75 | 1.00 | 1.19 |
| 9800 | 0.74 | 1.00 | 1.20 |
| 10000 | 0.74 | 1.00 | 1.20 |

LIGHT-EMITTING APPARATUS, IMAGE PICKUP APPARATUS, AND CAMERA SYSTEM CAPABLE OF CHANGING EMISSION COLOR TEMPERATURE

BACKGROUND OF THE INVENTION

1. Field of the Invention

The present invention relates to a light-emitting apparatus, an image pickup apparatus, and a camera system capable of changing emission color temperature by controlling the amount of light emitted by a plurality of light-emitting devices.

2. Description of the Related Art

In general, a light-emitting apparatus such as a strobe apparatus used for a camera uses a discharge tube such as a xenon tube is used as a light source for the apparatus. The color temperature of emitted light (strobe light) in a strobe apparatus using a xenon tube is set around sunlight (6000 K). Thus, when shooting is performed using the strobe apparatus in an environment at a color temperature different from that color temperature, color temperature of the light source differs between an area radiated with strobe light and an area not radiated with strobe light, and hence white balancing cannot be properly performed, and images taken are in unnatural colors.

Accordingly, in recent years, there have been proposed strobe apparatuses that use an LED (light-emitting diode) as a light source and manually or automatically change the color temperature of strobe light (see, for example, Japanese Laid-Open Patent Publication (Kokai) No. 2002-116481). A strobe apparatus using an LED as a light source will hereafter referred to as an LED strobe apparatus.

There have also been proposed LED strobe apparatuses in which a light-emitting unit producing a flash of light using LEDs of three colors, red (R), green (G), and blue (B) is provided as a supplementary light-emitting unit separately from a discharge tube such as a xenon tube. Here, light is emitted at the same time as light emission of the discharge tube at color temperatures of strobe light which can be changed by changing the amount of light emitted by the LEDs of the three colors R, G, and B (see, for example, Japanese Laid-Open Patent Publication (Kokai) No. 2006-322986).

The LED strobe apparatus has the LEDs of the three colors, red (R), green (G), and blue (B) as light sources as described above, and the degree to which the LEDs deteriorate differs according to environments where the LED strobe apparatus is used. For example, when the LED strobe apparatus is used in an environment where color temperature is low, taken images are usually prevented from being in unnatural colors by setting color temperature low in the LED strobe apparatus. In this case, a flash of light is emitted with the red LED emitting a large amount of light and the blue LED emitting a small amount of light relatively.

As a result, if the LED strobe apparatus is frequently used in an environment where color temperature is low, the red LED deteriorates more quickly than the blue LED.

On the other hand, the LEDs are generally sealed in packages, and it is known that a constituent material (for example, resin) used for the packages deteriorates due to light energy. The red LED, the green LED, and the blue LED are used to emit the same amount of light, resin for the blue LED which has more intense light energy deteriorates more quickly than resin for the red LED.

Because the red LED, the green LED, and the blue LED deteriorate to different degrees as described above, a problem described hereafter arises. Specifically, even when the LEDs are flashed with the same amount of light at an initial stage in the usage of the LED strobe apparatus and after the LED storage apparatus has been continuously used, the emission color temperature of the LED strobe apparatus varies. As a result, when shooting is performed by flashing the LED strobe apparatus, taken images having desired tones cannot be obtained.

SUMMARY OF THE INVENTION

The present invention provides a light-emitting apparatus, an image pickup apparatus, and a camera system capable of emitting light at desired emission color temperature even when aged deterioration of a light-emitting unit occurs.

Accordingly, a first aspect of the present invention provides a light-emitting apparatus that has a light-emitting unit comprising a plurality of light-emitting devices that emit light in different colors, and is capable of changing emission color temperature of the light-emitting unit by changing a ratio of an amount light emitted by the plurality of light-emitting devices, comprising a setting unit configured to set a emission color temperature of the light-emitting unit, a light emission control unit configured to flash the light-emitting unit based on parameters corresponding to the emission color temperature set by the setting unit, an obtainment unit configured to, based on image data obtained by performing image pickup by flashing the light-emitting unit based on the parameters corresponding to the emission color temperature set by the setting unit, obtain color temperature data on the image data, and a correction unit configured to correct the parameters corresponding to the emission color temperature set by the setting unit based on the color temperature data on the emission color temperature set by the setting unit and the color temperature data obtained by the obtainment unit.

Accordingly, a second aspect of the present invention provides an image pickup apparatus that has a light-emitting unit comprising a plurality of light-emitting devices that emit light in different colors, and is capable of changing emission color temperature of the light-emitting unit by changing a ratio of an amount light emitted by the plurality of light-emitting devices, comprising an image pickup unit configured to perform image pickup and output image data, a setting unit configured to set a emission color temperature of the light-emitting unit, a light emission control unit configured to flash the light-emitting unit based on parameters corresponding to the emission color temperature set by the setting unit, an obtainment unit configured to, based on image data obtained by performing image pickup by flashing the light-emitting unit based on the parameters corresponding to the emission color temperature set by the setting unit, obtain color temperature data on the image data, and a correction unit configured to correct the parameters corresponding to the emission color temperature set by the setting unit based on the color temperature data on the emission color temperature set by the setting unit and the color temperature data obtained by the obtainment unit.

Accordingly, a third aspect of the present invention provides a camera system that has a light-emitting apparatus, which comprises a plurality of light-emitting devices that emit light in different colors, and is capable of changing emission color temperature of the light-emitting unit by changing a ratio of an amount light emitted by the plurality of light-emitting devices, and an image pickup apparatus, comprising an image pickup unit configured to perform image pickup and output image data, a setting unit configured to set a emission color temperature of the light-emitting unit, a light emission control unit configured to flash the light-emitting unit based on parameters corresponding to the emission color temperature set by the setting unit, an obtainment unit configured to, based on image data obtained by performing image pickup by flashing the light-emitting unit based on the parameters corresponding to the emission color temperature set by the setting unit, obtain color temperature data on the image data, and a correction unit configured to correct the parameters corresponding to the emission color temperature set by the setting unit based on the color temperature data on the emission color temperature set by the setting unit and the color temperature data obtained by the obtainment unit.

According to the present invention, the light-emitting unit can be caused to emit light at desired emission color temperature even when aged deterioration of the light-emitting unit occurs.

Further features of the present invention will become apparent from the following description of exemplary embodiments (with reference to the attached drawings).

DESCRIPTION OF THE EMBODIMENTS

A description will now be given of a light-emitting apparatus (strobe apparatus) according to an embodiment of the present invention with reference to the drawings.

Figure 1:
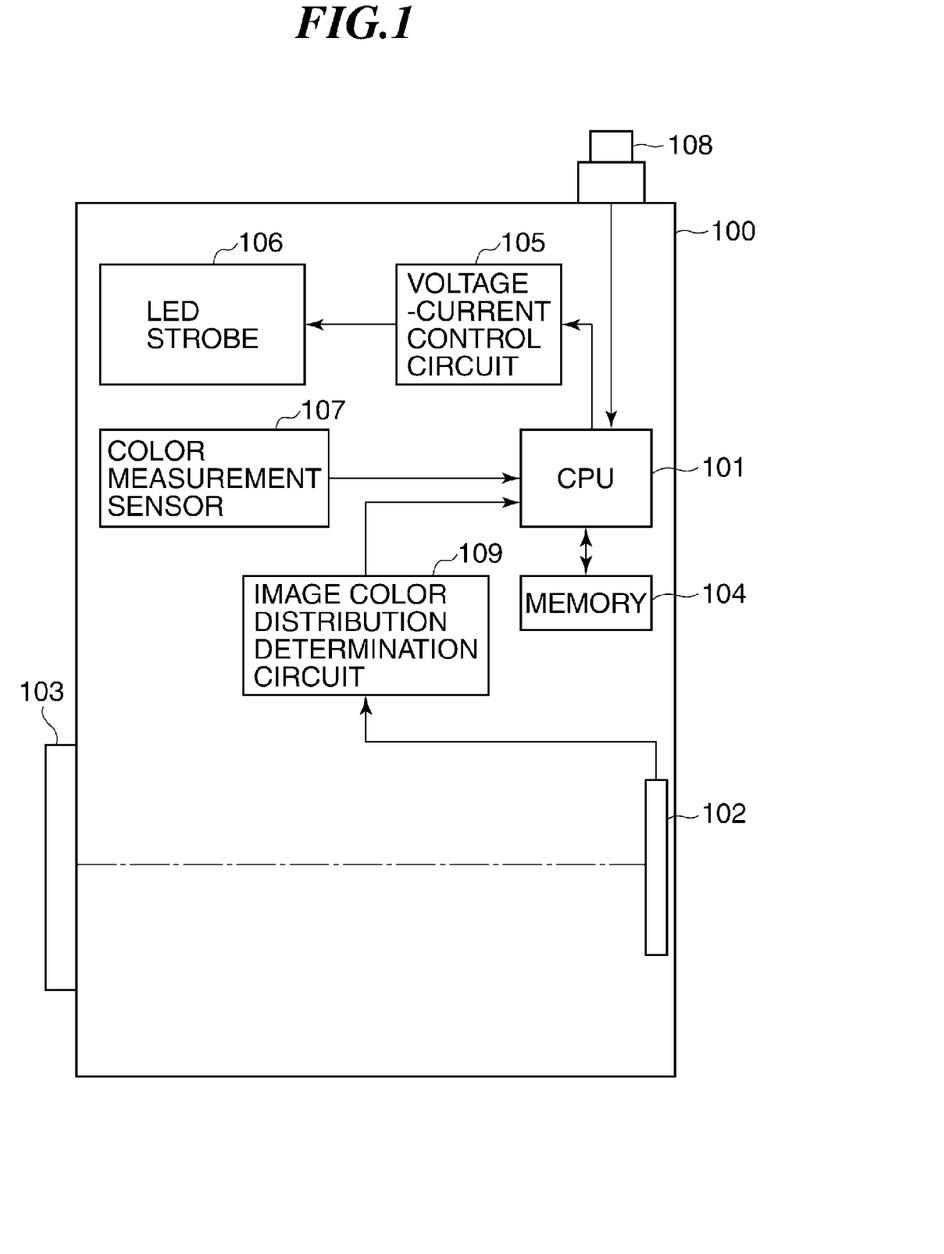
FIG. 1 is a block diagram showing a camera for which an exemplary strobe apparatus according to an embodiment of the present invention is used.

FIG. 1 is a block diagram showing a camera for which an exemplary strobe apparatus according to the embodiment of the present invention is used. The camera 100 shown in the figure has a microcomputer (hereafter referred to as the CPU) 101, which controls components of the camera 100. In the camera 100 shown in the figure, a subject image (optical image) is formed on an image pickup device 102 through a taking lens 103. The image pickup device 102 converts the formed optical image into an electric signal (image signal). Although not shown in FIG. 1, the image signal is subjected to, for example, image processing by an image processing circuit, and stored as image data in a recording medium, not shown. It should be noted that the image pickup device 102 is, for example, a CCD or a CMOS including an infrared cut filter, a low-pass filter, and so on.

Further, the camera 100 has a memory (storage unit) 104, in which color temperature information (hereafter also referred to as the color temperature table), to be described later, is stored. The camera 100 also has a voltage-current control circuit 105, an LED strobe (light-emitting unit) 106, and a color measurement sensor 107. The operation of the LED strobe 106 is controlled by the voltage-current control circuit 105 with respect to each LED color of red (R), green (G), and blue (B) as will be described later.

When a shutter button 108 is operated, the CPU 101 detects this operation and controls components of the camera 100 so as to start a shooting operation.

As shown in the figure, an output signal (i.e., an image signal) from the image pickup device 102 is supplied to an image color distribution determination circuit 109. Then, the image color distribution determination circuit 109 determines the color distribution of the image signal and supplies a color distribution determination result to the CPU 101 as will be described later.

The color measurement sensor 107 is a sensor for measuring the color distribution of outside light (ambient light), and the color distribution of outside light measured by the color measurement sensor 107 is supplied as an outside light color distribution determination result to the CPU 101. Based on the outside light color distribution determination result, the CPU 101 can recognize the relative ratio of red (R), green (G), and blue (B) in outside light. Based on the color distribution determination result and the outside light color distribution determination result, the CPU 101 controls the voltage-current control circuit 105 as will be described later.

It should be noted that in the exemplary arrangement shown in the figure, the LED strobe apparatus which is a light-emitting apparatus is built in the camera 100, the LED strobe apparatus may be removable from the camera 100. In this case, the LED strobe apparatus has only to satisfy the above described requirements when used in conjunction with the camera 100.

Figure 2:
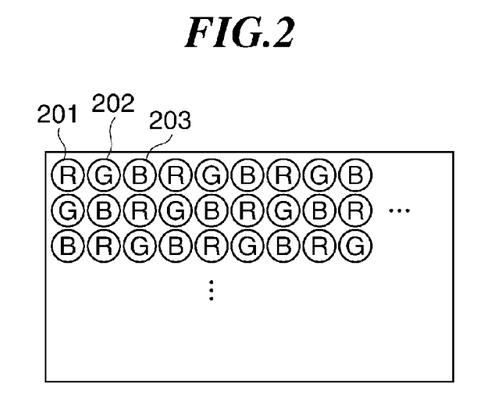
FIG. 2 is a view showing LEDs of respective colors, which are provided in an LED strobe appearing in FIG. 1, as seen from front.

FIG. 2 is a view showing LEDs of respective colors, which are provided in the LED strobe 106 appearing in FIG. 1, as seen from front. The LED strobe 106 has a plurality of light emitting element, that is, red (R) LEDs 201, green (G) LEDs 202, and blue (B) LEDs 203. In the examples shown in the figure, the red (R) LED 201, the green (G) LED 202, and the blue (B) LED 203 are arranged in this order repeatedly along lines.

The LED strobe 106 controls the amount of light emission with respect to each of the red (R) LED 201, the green (G) LED 202, and the blue (B) LED 203. As will be described later, the CPU 101 controls the voltage-current control circuit 105 based on the emission ratio of the red (R) LED 201, the green (G) LED 202, and the blue (B) LED 203. Forward current passed through each LED 201 is adjusted using the voltage-current control circuit 105 so that emission color temperature can be changed to a desired emission color temperature.

Figure 3:
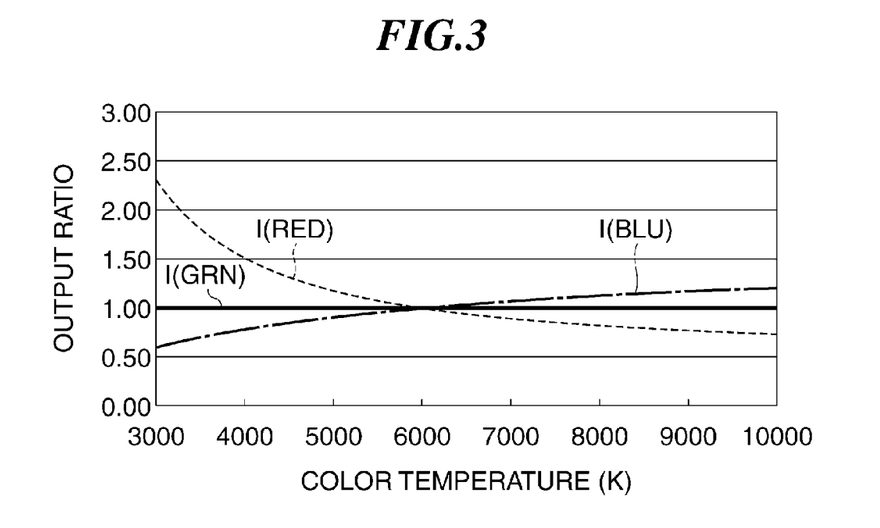
FIG. 3 is a graph showing the relationship between emission ratio (relative intensity) of a red (R) LED, a green (G) LED, and a blue (B) LED and color temperature in the LED strobe appearing in FIG. 2.
Figure 4:
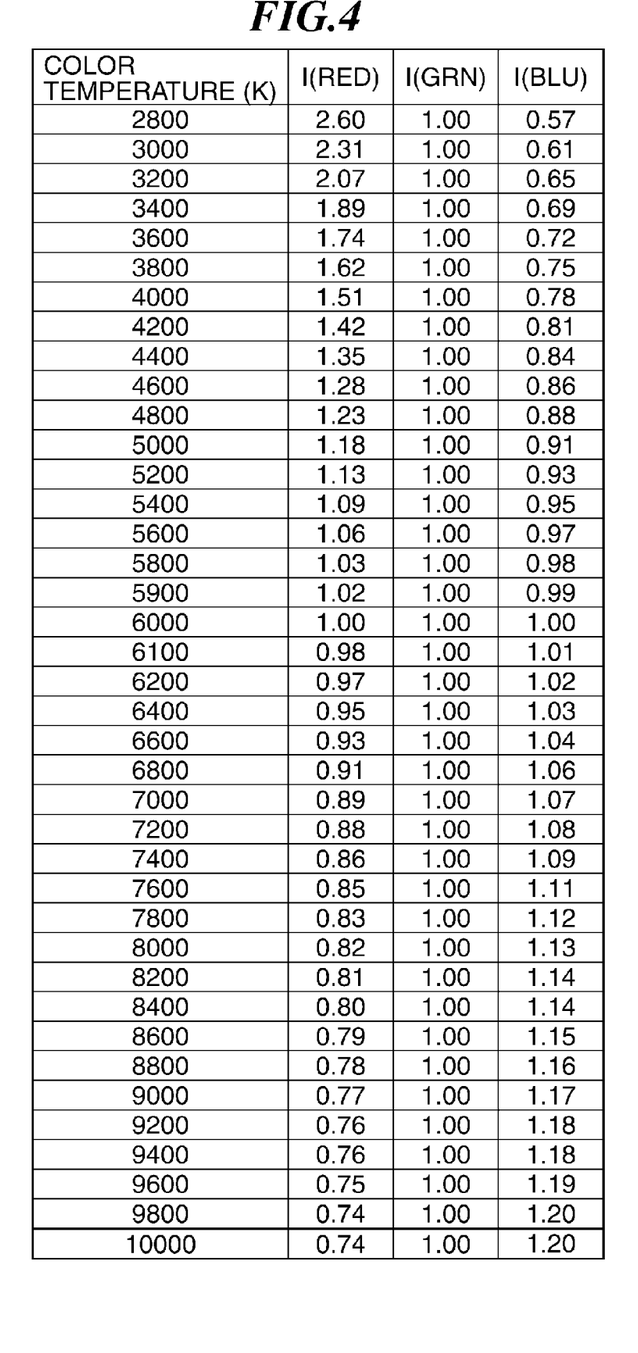
FIG. 4 is a view showing a table useful in explaining the relationship between emission ratio (relative intensity) of a red (R) LED, a green (G) LED, and a blue (B) LED and color temperature in the LED strobe appearing in FIG. 2.

FIG. 3 is a graph showing the relationship between emission ratio (relative intensity) of the red (R) LED 201, the green (G) LED 202, and the blue (B) LED 203 and color temperature in the LED strobe 106 appearing in FIG. 2. FIG. 4 is a view showing a table useful in explaining the relationship between emission ratio (relative intensity) of the red (R) LED 201, the green (G) LED 202, and the blue (B) LED 203 and color temperature in the LED strobe 106 appearing in FIG. 2.

Here, the relative intensity I(RED) of the red (R) LED 201 and the relative intensity I(BLU) of the blue (B) LED 203 are expressed in output ratios in a case where light is emitted at color temperatures of 3000K to 10000K where the relative intensity I(GRN) of the green (R) LED 202 is "1".

As shown in the figure, at a color temperature of about 3000 K, the output ratio of RED is high, and the output ratio of BLU is low. As color temperature increases, the output ratio of RED gradually decreases, and the output ratio of BLU gradually increases. Then, at a color temperature of about 6000 K, the output ratios of RED, GRN, and BLU are all "1".

As color temperature further increases, the output ratio of RED becomes lower than "1", and the output ratio of BLU becomes higher than "1". Then, at a color temperature of about 10000 K, the output ratio of RED reaches about "0.75", and the output ratio of BLU reaches about "1.2". Thus, the output ratio of RED decreases with increase in color temperature, and the output ratio of BLU increases with increase in color temperature.

The output ratios shown in FIG. 3 or FIG. 4 are stored as, for example, a table (that is, color temperature information) in the memory 104. Based on the color distribution measurement result from the color measurement sensor 107 described above, the CPU 101 recognizes the relative ratio of red (R), green (G) and blur (B) in outside light. The CPU 101 then obtains color temperature in outside light by referring to the color temperature information based on the relative ratio of red (R), green (G) and blur (B).

Next, a description will be given of how the LED strobe apparatus appearing in FIG. 1 operates.

Figure 5:
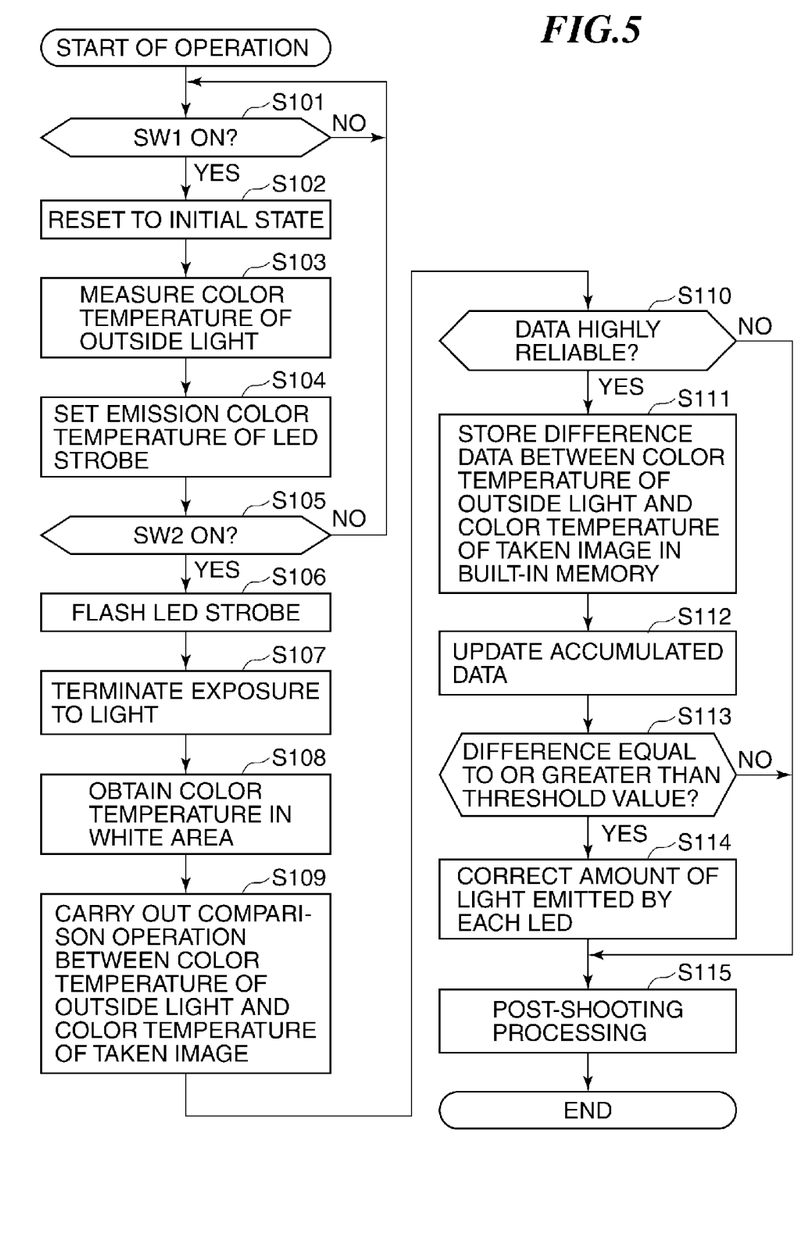
FIG. 5 is flowchart useful in explaining how the LED strobe apparatus in FIG. 1 operates.

FIG. 5 is flowchart useful in explaining how the LED strobe apparatus appearing in FIG. 1 operates.

First, when the power is turned on, and the camera 100 starts operating, the CPU 101 determines whether or not a switch SW1 indicative of the shutter button 108 being pressed halfway down is on (step S101). When the switch SW1 is off, the CPU 101 comes into a standby state.

On the other hand, upon determining that the switch SW1 is on, the CPU 101 resets the camera 100 to its initial state (step S102), and reads statuses of various switches and input information set in advance, which are input from an input unit (not shown). Then, the CPU 101 sets exposure time (TV), aperture value (AV), various shooting modes, and so on.

Then, the CPU 101 obtains color temperature of outside light in the above described way based on the distribution of colors measured by the color measurement sensor 107 (step S103). Then, based on the color temperature of outside light, the CPU 101 sets a color temperature (emission color temperature) at which the LED strobe 106 is flashed as a set emission color temperature (set emission color temperature data) (step S104).

Then, the CPU 101 determines whether or not a switch SW2 indicative of the shutter button 108 being pressed all the way down is on (step S105). Upon determining that the switch SW2 is off, the CPU 101 returns to the step S101 and continues to carry out the process.

On the other hand, upon determining that the switch SW2 is on, the CPU 101 starts exposing the image pickup device 102 to light. Further, the CPU 101 controls the voltage-current control circuit 105 based on the set emission color temperature and causes the voltage-current control circuit 105 to drive and flash the LED strobe 106 (step S106).

Then, when the exposure to light is completed (step S107), the image color distribution determination circuit 109 carries out so-called white search on an image signal (image data) to search a white area of image data, which is obtained by shooting, to search for a white area in the image data. Here, white search means a process in which a color close to a black-body radiation locus is searched for across image data.

Then, the image color distribution determination circuit 109 determines the distribution of colors in the white area obtained by white search to obtain a color distribution determination result. The color distribution determination result is supplied from the image color distribution determination circuit 109 to the CPU 101.

The CPU 101 searches the color temperature information described above according to the ratio of red (R), green (G), and blue (B) indicated by the color distribution determination result to obtain a color temperature in the white area of the image data as a determined color temperature (image color temperature data) (step S108).

Then, the CPU 101 compares data on the set emission color temperature and data on the actual emission color temperature with each other. In other words, the CPU 101 carries out a comparison operation between a color temperature of outside light and a color temperature of a taken mage (step S109).

Assuming now that the set emission color temperature is 3000 K, when the red (R) LED 201 deteriorates to a greater extent than the green (G) and blue (B) LEDs 202 and 203, the actual emission color temperature is a temperature at which light has a bluish tinge as of 3100K. In this case, the difference between the set emission color temperature and the actual emission color temperature is 100 K to a bluish color, and data indicative of this value is difference data.

In this way, the CPU 101 determines that data indicative of the difference between data on the actual emission color temperature and data on the set emission color temperature is difference data (as described above, when the set emission color temperature is 3000 K, and the actual emission color temperature is 3100 K, a color temperature difference indicated by difference data is +100 K).

Then, the CPU 101 determines the reliability of the difference data (step S110). Upon determining that the reliability of the difference data is low, the CPU 101 proceeds to step S115, to be described later.

Here, when it is to be determined whether or not the reliability of the difference data is high, in a case where there is a great difference between the actual emission color temperature and the set emission color temperature, that is, in a case where the absolute value of the difference data is greater than a threshold value, for example, a case where outside light is highly influential or a case where white search ends in failure, the CPU 101 determines that the reliability of the difference data is low. On the other hand, when the absolute value of the difference data is no greater than the threshold value, the CPU 101 determines that the reliability of the difference data is high.

It should be noted that the case where outside light is highly influential means a case where outside light is more intense than strobe light, and in this case, the color temperature of the strobe light is unlikely to be reflected on a taken image. The case where white search ends in failure means a case where there is no color close to a black-body radiation locus in image data, and in this case, the distribution of colors needed to obtain color temperature cannot be well read.

Here, with consideration given to aged deterioration of LEDs and the like, a threshold value is set in advance, and when the absolute value of difference data is greater than the threshold value, the CPU 101 determines that the reliability of the difference data is low. In the example shown in FIG. 6, a value of, for example, ±300K is used as the threshold value set in advance (hereafter referred to as the reliability threshold value). Namely, when the difference data lies inside the range of ±300K, the CPU 101 determines that the reliability of the difference data is high.

It should be noted that the reliability threshold value mentioned above may be changed by actually measuring variations in the emission color temperature of the LED strobe 106.

Upon determining that the reliability of the difference data is high as described above, that is, when the absolute value of the difference data is not greater than the reliability threshold value, the CPU 101 stores the difference data in the memory 104 (step S111).

It should be noted that in the memory 104, a predetermined number of (for example, 100) pieces of difference data are stored with consideration given to the effects of variations in the emission of light in the LED strobe 106. Then, the CPU 101 averages the predetermined number of pieces of difference data to compute averaged difference data. As will be described later, the averaged difference data is used in correcting parameters relating to the emission ratio (ratio of the amount of light), which are parameters corresponding to emission color temperature.

To store the difference data, first-in first-out (FIFO) method is used. As a result, at the time of storing the predetermined number of pieces of difference data in the memory 104, the CPU 101 discards the oldest difference data and stores the latest difference data in the memory 104, and as a result, accumulated data is updated (step S112).

Namely, whenever shooting is performed, the CPU 101 stores difference data in the memory 104 until the number of pieces of difference data reaches a predetermined number. When the number of pieces of difference data stored in the memory 104 reaches the predetermined number, the CPU 101 stores the remainder of the difference data in the memory 104 using the FIFO method.

After executing the step S112, the CPU 101 determines whether or not the absolute value of the averaged difference data obtained by averaging the plurality of pieces of difference data is equal to or greater than a predetermined threshold value (hereafter referred to as the correction threshold value) (step S113). In the example shown in FIG. 6, the correction threshold value is ±100 K beyond which a user can be aware of a difference between two taken images having different color temperatures when they are placed side by side. Namely, the CPU 101 determines whether or not the value of the averaged difference data lies inside the range of ±100 K.

Figure 6:
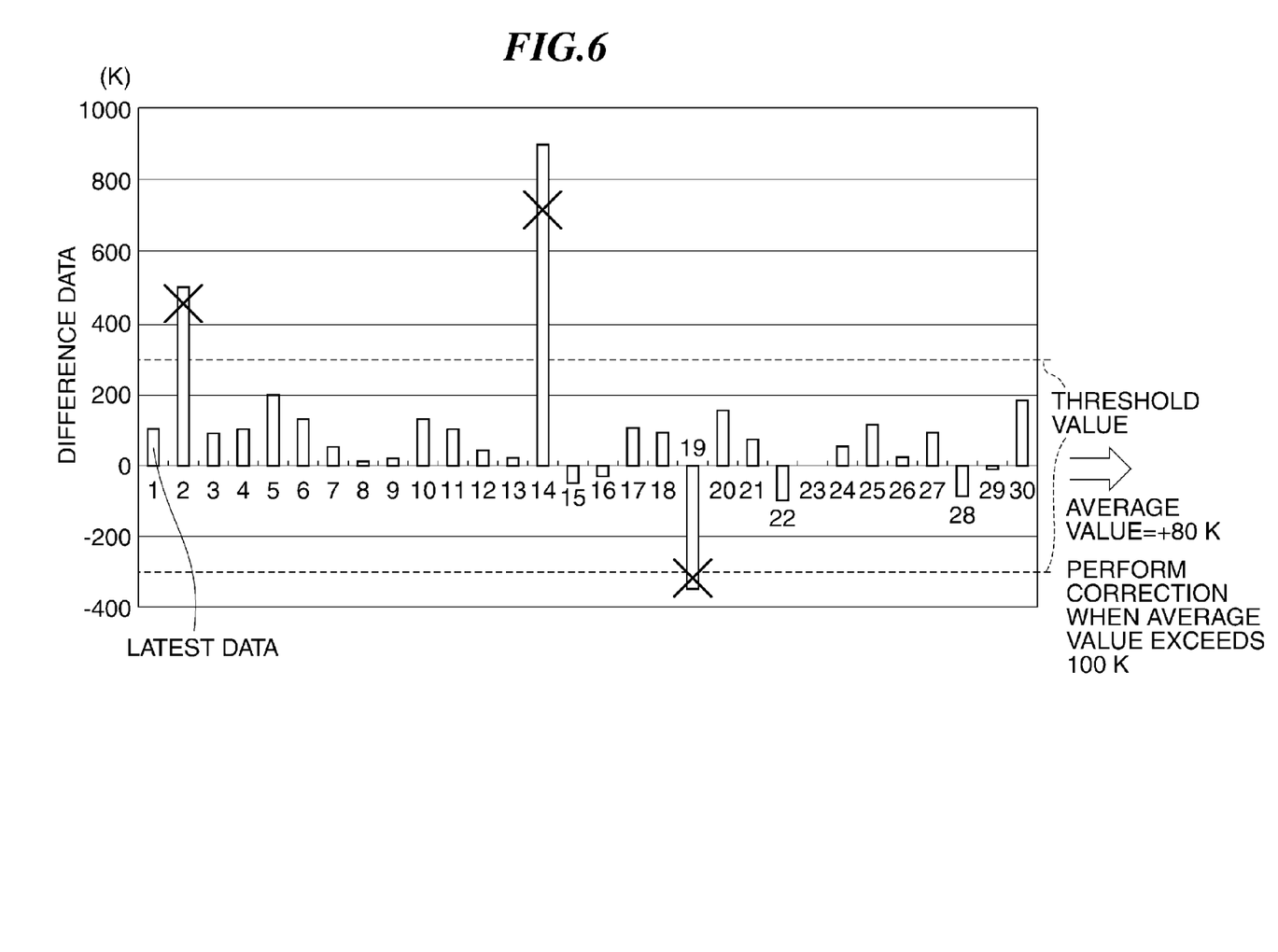
FIG. 6 is a diagram useful in explaining exemplary difference data stored in a built-in memory appearing in FIG. 1.

FIG. 6 is a diagram useful in explaining exemplary difference data stored in the memory 104 appearing in FIG. 1.

Referring to FIG. 6, the vertical axis represents difference data, and the horizontal axis represents the difference data in reverse chronological order, to which numbers are assigned in descending order. As described above, in the example shown in the figure, when the value of difference data is greater than the reliability threshold value (±300 K), the CPU 101 determines that the reliability of the difference data is low, and does not store the difference data in the memory 104. It should be noted that in the example shown in FIG. 6, it is determined that the reliabilities of difference data to which data numbers "2", "14", and "19" are assigned are low, and they are not stored in the memory 104, but they are shown in the figure with their data numbers for the convenience of explanation. Namely, in the state shown in FIG. 6, 27 pieces of difference data except for difference data to which data numbers "2", "14", and "19" are assigned are actually stored in the memory 104.

Moreover, there are variations in difference data as described above, and to reduce such variations, values of a predetermined number of pieces of difference data are averaged into averaged difference data. In the example shown in FIG. 6, the value of the averaged difference data is "±80 K", and the CPU 101 determines not to correct parameters relating to the emission ratio (ratio of the amount of light).

On the other hand, in the example shown in FIG. 6, when the value of the averaged difference data is equal to or greater than the correction threshold value (±100 K), the CPU 101 determines to correct parameters relating to the emission ratio (ratio of the amount of light) based on the averaged difference data.

As described above, when the value of the averaged difference data is smaller than the correction threshold value, the CPU 101 determines not to perform correction and proceeds to step S115, to be described later.

On the other hand, when the value of the averaged difference data is equal to or greater than the correction threshold value, the CPU 101 corrects the amount of emitted light (i.e., light amount ratio) with respect to each of the red (R) LED 201, the green (G) LED 202, and the blue (B) LED 203 (step S114). Namely, the CPU 101 corrects the emission ratio of the red (R) LED 201, the green (G) LED 202, and the blue (B) LED 203. In this case, the CPU 101 controls the voltage-current control circuit 105 to control forward current passed through the red (R) LED 201, the green (G) LED 202, and the blue (B) LED 203.

For example, when the value of the averaged difference data is not less than +100 K, it can be thought that the red (R) LED 201 has deteriorated to a greater extent than the green (G) LED 202 and the blue (B) LED 203. In this case, even when the LED strobe 106 is to be flashed at a color temperature of 6000 K, the ratio between R, G, and B has not reached 1:1:1. Actually, the LED strobe 106 is flashed when the emission ratio between R, G, and B is around 0.98:1:1.01 in the vicinity of 6100 K indicated in FIG. 4.

Thus, emission color temperature is not 6000 K. To correct emission color temperature, it is necessary to flash the red LED about 2% more intensely and flash the blue LED about 1% less intensely.

Figure 7:
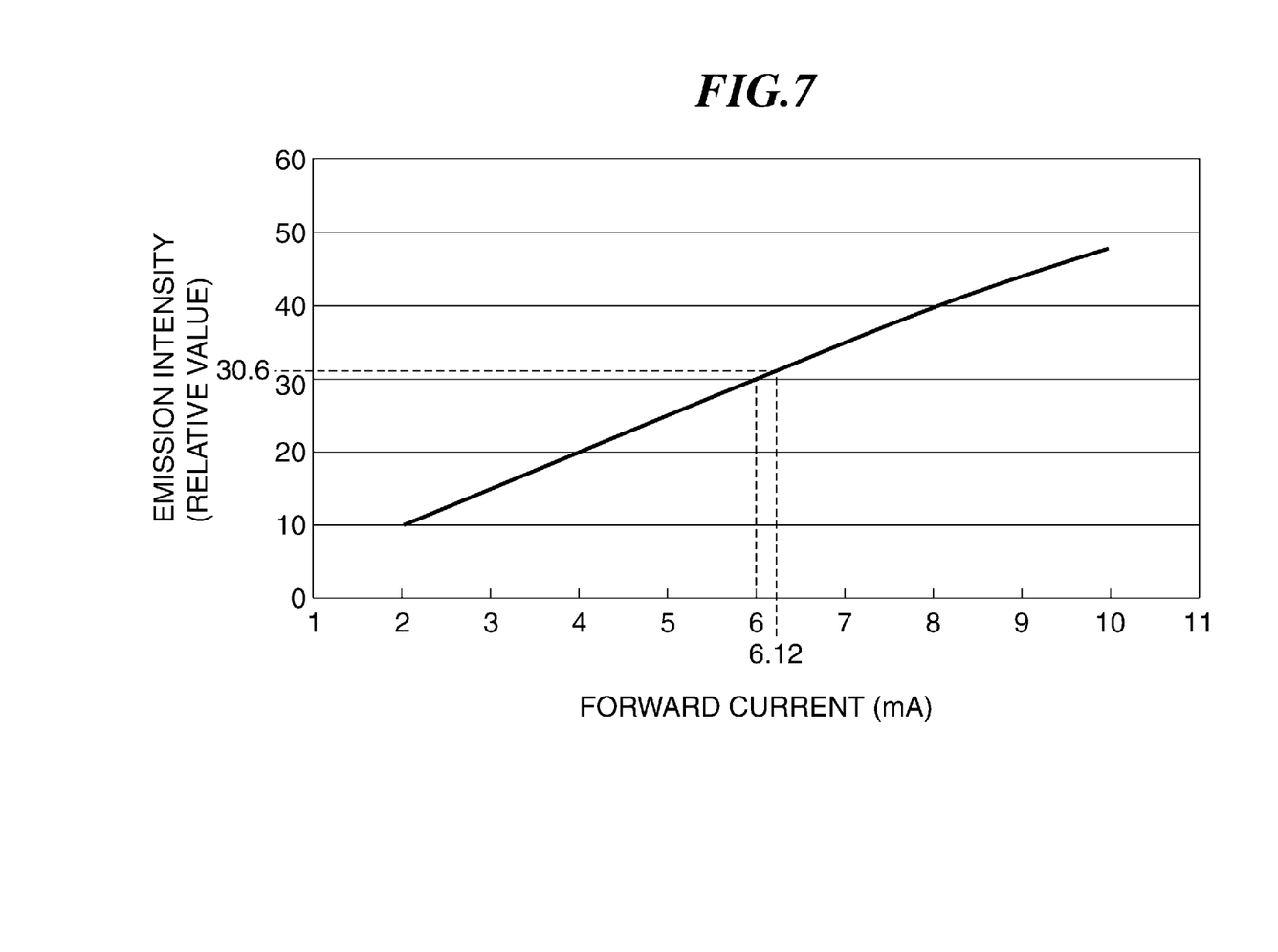
FIG. 7 is a diagram showing the relationship between electric current passed through the LEDs appearing in FIG. 1 and emission intensity.

FIG. 7 is a diagram showing the relationship between forward current passed through the LEDs 201 to 203 appearing in FIG. 2 and emission intensity. It should be noted that the relationship between forward current and emission intensity is stored as a current-emission intensity table in, for example, the memory 104.

In the example shown in the figure, a linear section (region) in which forward current and emission intensity are proportional to each other is used, and for example, a forward current of 6 mA is passed through the red (R) LED 201 before correction. In this case, when forward current passed through the red (R) LED 201 is increased to 6.12 mA, the amount of light emitted by the red (R) LED 201 increases about 2%. Then, by correcting forward current passed through the blue (B) LED 203 in the same way, the ratio between R, G, and B can be corrected to 1:1:1. Namely, by correcting parameters relating to current supplied to the red (R) LED 201, the green (G) LED 202, and the blue (B) LED 203, the ratio between R, G, and B can be corrected to 1:1:1.

When the value of the averaged difference data thus becomes equal to or greater than the correction threshold value, the CPU 101 subsequently corrects forward current passed through the red (R) LED 201, the green (G) LED 202, and the blue (B) LED 203. After that, the CPU 101 carries out post-shooting processing (for example, image processing) (step S115), and terminates the process.

When difference data is to be stored in the memory 104, the difference data may be stored in several split regions according to set emission color temperature.

Figure 8:
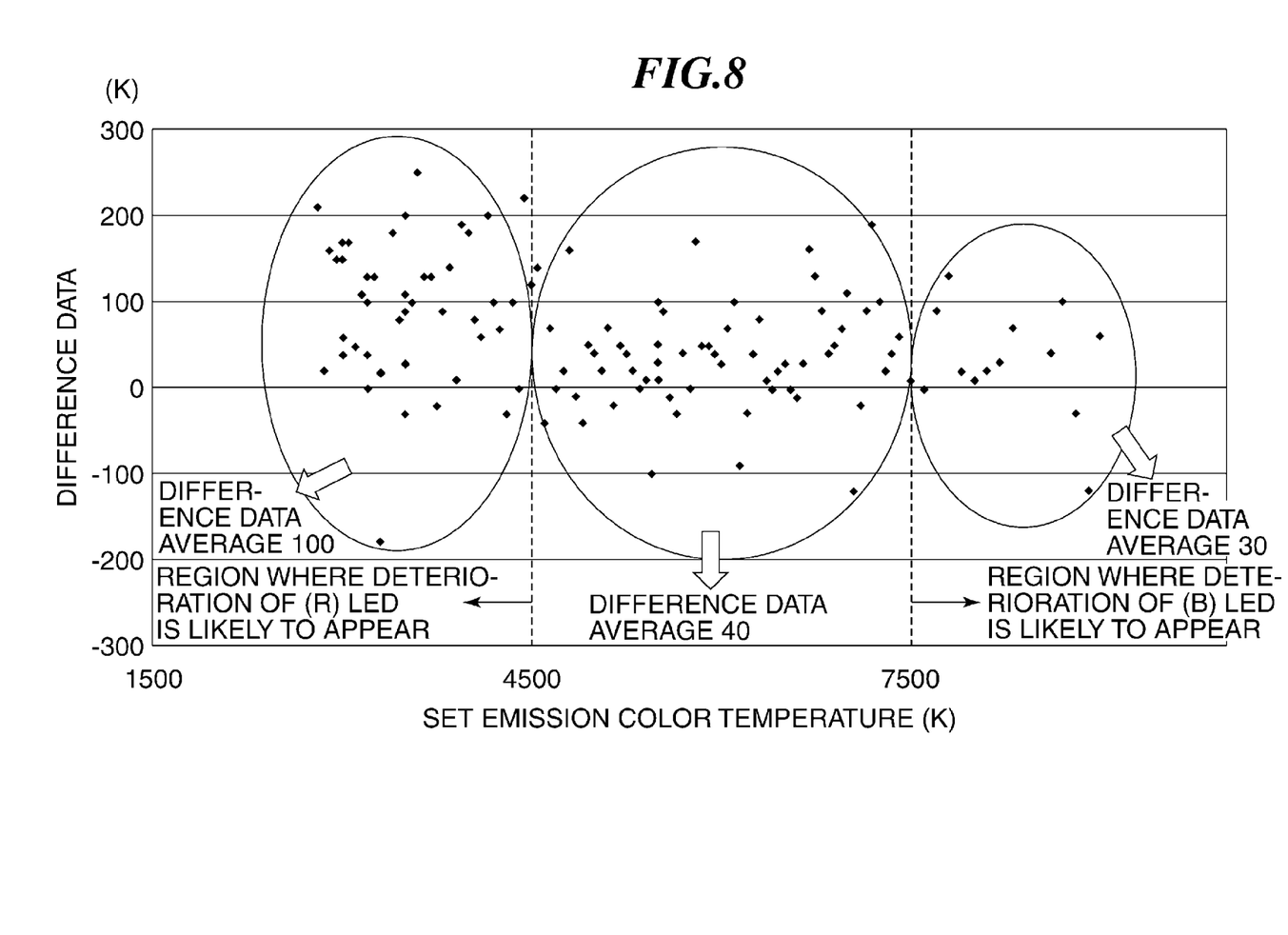
FIG. 8 is a diagram useful in explaining difference data stored according to set emission color temperature with consideration given to a case where a red (R) LED appearing in FIG. 2 has deteriorated.

FIG. 8 is a diagram useful in explaining difference data stored according to set emission color temperature with consideration given to a case where the red (R) LED 201 appearing in FIG. 2 has deteriorated.

Referring to FIG. 8, the horizontal axis represents set emission color temperature, and the vertical axis represents difference data. Here, difference data is divided into a first region in which set emission color temperature is not more than 4500 K, a second region in which set emission color temperature is 4500 K to 7500 K, and a third region in which set emission color temperature is not less than 7500 K.

As shown in the figure, in the first region in which set emission color temperature is 4500 K to 7500 K, the amount of light emitted by the red (R) LED 201 is relatively large, and hence deterioration of the red (R) LED 201 is likely to appear. On the other hand, in the third region in which set emission color temperature is not less than 7500K, deterioration of the blue (B) LED 203 is likely to appear.

In the above described way, difference data is accumulated in the first to third split regions, and difference data in each of the first to third regions is averaged to obtain averaged difference data in each region, that is, averaged difference data corresponding to set emission color temperatures. Then, based on averaged difference data in regions corresponding to set emission color temperatures, the CPU 101 determines whether or not to correct the emission ratio, so that the amount of emitted light can be corrected with high accuracy.

Namely, difference data is divided into first to third divided groups according to set emission color temperatures and separately stored in the memory 104. Then, the CPU 101 obtains averaged difference data in each of the first to third groups, and determines whether or not to correct the emission ratio according to averaged difference data in groups corresponding to set emission color temperatures.

It should be noted that in the above described example, the LED strobe 106 is built in the camera 100. However, when an external LED strobe unit is used, the CPU 101 provided in the camera 100 may communicate with a CPU provided in the LED strobe unit to store difference data in a memory built in the LED strobe unit. On this occasion, the above described computations are performed by the CPU provided in the LED strobe unit, and the voltage-current control circuit 105 is provided in the LED strobe unit.

As described above, the LED strobe apparatus according to the embodiment of the present invention can be flashed at color temperatures close to those in the initial stage of usage even if LEDs deteriorate, and thus images with desired tones can be taken.

Moreover, because the amount of light emitted by each LED is automatically corrected as described above, the user can perform shooting without being aware of changes in the color temperature of the LED strobe.

It should be noted that when the value of averaged difference data becomes equal to or greater than the threshold value while strobe shooting is performed as in the case of continuous strobe shooting, emission color temperature may not be corrected until the continuous strobe shooting ends. When emission color temperature is corrected during continuous shooting with the flash on, tones of obtained continuous images change in midstream even if shooting is continuously performed, and thus the continuity of the images is lost.

Moreover, although in the embodiment of the present invention, the emission color temperature of the LED strobe 106 is set based on the color temperature of outside light measured by the color measurement sensor 107, the user may arbitrarily set a desired emission color temperature through an operation unit, not shown.

Moreover, although in the embodiment of the present invention, the magnitudes of forward currents passed through the LEDs 201 to 203 are changed as parameters relating to currents supplied to a plurality of light-emitting devices so as to correct the emission ratio between the LEDs 201, 202, and 203, time periods for which forward currents are passed through the LEDs 201 to 203, that is, time periods for which the LEDs 201 to 203 emit light may be changed as parameters relating to currents supplied to a plurality of light-emitting devices.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-172196 filed Jul. 30, 2010, which is hereby incorporated by reference herein in its entirety.

What is claimed is:

1. A light-emitting apparatus that has a light-emitting unit comprising a plurality of light-emitting devices that emit light in different colors, and is capable of changing emission color temperature of the light-emitting unit by changing a ratio of an amount light emitted by the plurality of light-emitting devices, comprising:
   a setting unit configured to set an emission color temperature of the light-emitting unit;
   a light emission control unit configured to flash the light-emitting unit based on parameters corresponding to the emission color temperature set by said setting unit;
   an obtainment unit configured to, based on image data obtained by performing image pickup by flashing the light-emitting unit based on the parameters corresponding to the emission color temperature set by said setting unit, obtain color temperature data on the image data; and
   a correction unit configured to correct the parameters corresponding to the emission color temperature set by said setting unit based on the color temperature data on the emission color temperature set by said setting unit and the color temperature data obtained by said obtainment unit.

2. The light-emitting apparatus according to claim 1, wherein based on difference data indicative of a difference between the color temperature data on the emission color temperature set by said setting unit and the color temperature data obtained by said obtainment unit, the parameters corresponding to the emission color temperature set by said setting unit are corrected.

3. The light-emitting apparatus according to claim 2, further comprising:
   a storage unit configured to store the difference data; and a storage control unit configured to cause said storage unit to store the difference data when the difference data has a high reliability.

4. The light-emitting apparatus according to claim 3, wherein said storage control unit determines whether the difference data has a high reliability whenever an image is picked up by flashing the light-emitting unit.

5. The light-emitting apparatus according to claim 3, wherein said storage control unit determines that the difference data has a high reliability when an absolute value of a value of the difference data is not greater than a threshold value.

6. The light-emitting apparatus according to claim 3, further comprising a computation unit configured to compute averaged difference data by averaging a predetermined number of pieces of difference data stored in said storage unit,
wherein, when an absolute value of the averaged difference data is equal to or greater than a threshold value, said correction unit corrects the parameters corresponding to the emission color temperature set by said setting unit.

7. The light-emitting apparatus according to claim 1, wherein the parameters corresponding to the emission color temperature set by said setting unit are parameters relating to a ratio of an amount of light emitted by the plurality of light-emitting devices.

8. The light-emitting apparatus according to claim 1, wherein the parameters corresponding to the emission color temperature set by said setting unit are parameters relating to current passed through the plurality of light-emitting devices.

9. An image pickup apparatus that has a light-emitting unit comprising a plurality of light-emitting devices that emit light in different colors, and is capable of changing emission color temperature of the light-emitting unit by changing a ratio of an amount light emitted by the plurality of light-emitting devices, comprising:
an image pickup unit configured to perform image pickup and output image data;
a setting unit configured to set an emission color temperature of the light-emitting unit;
a light emission control unit configured to flash the light-emitting unit based on parameters corresponding to the emission color temperature set by said setting unit;
an obtainment unit configured to, based on image data obtained by performing image pickup by flashing the light-emitting unit based on the parameters corresponding to the emission color temperature set by said setting unit, obtain color temperature data on the image data; and
a correction unit configured to correct the parameters corresponding to the emission color temperature set by said setting unit based on the color temperature data on the emission color temperature set by said setting unit and the color temperature data obtained by said obtainment unit.

10. The image pickup apparatus according to claim 9, wherein based on difference data indicative of a difference between the color temperature data on the emission color temperature set by said setting unit and the color temperature data obtained by said obtainment unit, the parameters corresponding to the emission color temperature set by said setting unit are corrected.

11. The image pickup apparatus according to claim 10, further comprising:
a storage unit configured to store the difference data; and
a storage control unit configured to cause said storage unit to store the difference data when the difference data has a high reliability.

12. The image pickup apparatus according to claim 11, wherein said storage control unit determines whether the difference data has a high reliability whenever an image is picked up by flashing the light-emitting unit.

13. The image pickup apparatus according to claim 11, wherein said storage control unit determines that the difference data has a high reliability when an absolute value of a value of the difference data is not greater than a threshold value.

14. The image pickup apparatus according to claim 11, further comprising a computation unit configured to compute averaged difference data by averaging a predetermined number of pieces of difference data stored in said storage unit,
wherein, when an absolute value of the averaged difference data is equal to or greater than a threshold value, said correction unit corrects the parameters corresponding to the emission color temperature set by said setting unit.

15. The image pickup apparatus according to claim 9, wherein the parameters corresponding to the emission color temperature set by said setting unit are parameters relating to a ratio of an amount of light emitted by the plurality of light-emitting devices.

16. The image pickup apparatus according to claim 9, wherein the parameters corresponding to the emission color temperature set by said setting unit are parameters relating to current passed through the plurality of light-emitting devices.

17. A camera system that has a light-emitting apparatus, which comprises a plurality of light-emitting devices that emit light in different colors, and is capable of changing emission color temperature of the light-emitting unit by changing a ratio of an amount light emitted by the plurality of light-emitting devices, and an image pickup apparatus, comprising:
an image pickup unit configured to perform image pickup and output image data;
a setting unit configured to set an emission color temperature of the light-emitting unit;
a light emission control unit configured to flash the light-emitting unit based on parameters corresponding to the emission color temperature set by said setting unit;
an obtainment unit configured to, based on image data obtained by performing image pickup by flashing the light-emitting unit based on the parameters corresponding to the emission color temperature set by said setting unit, obtain color temperature data on the image data; and
a correction unit configured to correct the parameters corresponding to the emission color temperature set by said setting unit based on the color temperature data on the emission color temperature set by said setting unit and the color temperature data obtained by said obtainment unit.

18. The camera system according to claim 17, wherein based on difference data indicative of a difference between the color temperature data on the emission color temperature set by said setting unit and the color temperature data obtained by said obtainment unit, the parameters corresponding to the emission color temperature set by said setting unit are corrected.

19. The camera system according to claim 18, further comprising:
a storage unit configured to store the difference data; and
a storage control unit configured to cause said storage unit to store the difference data when the difference data has a high reliability.

20. The camera system according to claim 19, wherein said storage control unit determines whether the difference data has a high reliability whenever an image is picked up by flashing the light-emitting unit.

21. The camera system according to claim 19, wherein said storage control unit determines that the difference data has a high reliability when an absolute value of a value of the difference data is not greater than a threshold value.

22. The camera system according to claim 19, further comprising a computation unit configured to compute averaged difference data by averaging a predetermined number of pieces of difference data stored in said storage unit,
   wherein, when an absolute value of the averaged difference data is equal to or greater than a threshold value, said correction unit corrects the parameters corresponding to the emission color temperature set by said setting unit.

23. The camera system according to claim 17, wherein the parameters corresponding to the emission color temperature set by said setting unit are parameters relating to a ratio of an amount of light emitted by the plurality of light-emitting devices.

24. The camera system according to claim 17, wherein the parameters corresponding to the emission color temperature set by said setting unit are parameters relating to current passed through the plurality of light-emitting devices.

* * * * *